(12) United States Patent
Di Falco et al.

(10) Patent No.: US 11,650,540 B2
(45) Date of Patent: May 16, 2023

(54) HOLOGRAPHIC DEVICE

(71) Applicant: University Court of the University of St Andrews, St Andrews (GB)

(72) Inventors: Andrea Di Falco, St Andrews (GB); James Burch, St. Andrews (GB)

(73) Assignee: University Court of the University of St Andrews, St Andrews (GB)

( * ) Notice: Subject to any disclaimer, the term of this patent is extended or adjusted under 35 U.S.C. 154(b) by 110 days.

(21) Appl. No.: 16/765,825

(22) PCT Filed: Nov. 16, 2018

(86) PCT No.: PCT/GB2018/053323
§ 371 (c)(1),
(2) Date: May 20, 2020

(87) PCT Pub. No.: WO2019/102183
PCT Pub. Date: May 31, 2019

(65) Prior Publication Data
US 2020/0356047 A1 Nov. 12, 2020

(30) Foreign Application Priority Data
Nov. 24, 2017 (GB) ...................... 1719588

(51) Int. Cl.
*G03H 1/00* (2006.01)
*G03H 1/02* (2006.01)
*G03H 1/22* (2006.01)

(52) U.S. Cl.
CPC ......... *G03H 1/0011* (2013.01); *G03H 1/0244* (2013.01); *G03H 1/0272* (2013.01);
(Continued)

(58) Field of Classification Search
CPC .. G03H 1/0011; G03H 1/0244; G03H 1/0272; G03H 1/2202; G03H 1/2249;
(Continued)

(56) References Cited

U.S. PATENT DOCUMENTS 6,005,691 A * 12/1999 Grot ..................... G02B 5/1842
235/457
6,631,016 B1 10/2003 Klug et al.
(Continued)

FOREIGN PATENT DOCUMENTS

DE 19604856 A1 * 8/1997 ............. G07D 7/121
EP 0455823 A1 11/1991
(Continued)

OTHER PUBLICATIONS

Malek et al (Strain Multiplexed Metasurface holograms on a stretchable Substrate, NanoLetters, 17, pp. 3641-3645, May 10, 2017) (Year: 2017).*

(Continued)

*Primary Examiner* — Jade R Chwasz
*Assistant Examiner* — Jyotsna V Dabbi
(74) *Attorney, Agent, or Firm* — Locke Lord LLP; Christopher J. Capelli

(57) ABSTRACT

A holographic security or identification device (10) comprises an object, or a flexible substrate (12) configured to be conformable to a desired, curved shape; and a plurality of structures (14) formed on or in the object to have a desired curved configuration, or formed in or associated with the substrate and arranged to adopt a desired curved configuration when the substrate is conformed to a desired shape, (Continued)

wherein the plurality of structures (14) are configured to receive light (20) of a selected at least one wavelength or range of wavelengths and to produce, using the received light, a desired holographic image (22) for security or identification purposes when in the desired configuration.

22 Claims, 9 Drawing Sheets

(52) U.S. Cl.
CPC ......... *G03H 1/2202* (2013.01); *G03H 1/2249* (2013.01); *G03H 2001/0044* (2013.01); *G03H 2001/2231* (2013.01); *G03H 2001/2276* (2013.01); *G03H 2210/12* (2013.01); *G03H 2222/13* (2013.01); *G03H 2222/20* (2013.01); *G03H 2222/31* (2013.01); *G03H 2250/39* (2013.01); *G03H 2270/21* (2013.01); *G03H 2270/31* (2013.01)

(58) Field of Classification Search
CPC ...... G03H 1/02; G03H 1/0236; G03H 1/0808; G03H 1/0841; G03H 1/0891; G03H 1/2645; G03H 2001/0044; G03H 2001/2231; G03H 2001/2276; G03H 2001/0016; G03H 2001/0816; G03H 2001/2215; G03H 2001/2247; G03H 2001/267; G03H 2001/043; G03H 2001/0027; G03H 2001/0434; G03H 2210/12; G03H 2222/13; G03H 2222/20; G03H 2222/31; G03H 2227/05; G03H 2250/36; G03H 2250/39; G03H 2270/20; G03H 2270/22; G03H 2270/21; G03H 2270/31; G03H 2270/52; G03H 2270/23; G03H 2270/32; G02B 1/002; G02B 27/0172; G02B 5/1809; G02B 5/008; G02B 5/007; G02B 2027/01; G02B 2207/101; H01Q 15/0086; H01Q 15/38; H01L 51/0097; B82Y 20/00; B82Y 30/00; B82Y 40/00; G02F 2202/30; B42D 25/29; B42D 25/328; B42D 25/324; B42D 25/355; B42D 25/21; B42D 25/25; B42D 25/26; B42D 25/309; B42D 25/36; B42D 2033/18; B42D 2033/02; B42D 2033/04; B42D 2033/10; B42D 2033/24; B42D 2033/40; B42D 2033/44
USPC .............................................................. 359/2
See application file for complete search history.

(56) References Cited

U.S. PATENT DOCUMENTS

| | | |
|---|---|---|
| 2002/0001108 A1 | 1/2002 | Yeo |
| 2005/0260386 A1 | 11/2005 | Heinrich et al. |
| 2008/0213541 A1 | 9/2008 | Schilling et al. |
| 2013/0027678 A1* | 1/2013 | Dausman ............. G03F 7/7035 355/2 |
| 2016/0334758 A1 | 11/2016 | Shaltout et al. |
| 2017/0068214 A1 | 3/2017 | Tsai et al. |

FOREIGN PATENT DOCUMENTS

| | | | | |
|---|---|---|---|---|
| WO | WO-2004023220 A1 * | 3/2004 | ............ | G03H 1/04 |
| WO | WO-2010126485 A1 | 11/2010 | | |
| WO | WO-2010126493 A1 | 11/2010 | | |
| WO | WO-2016181253 A1 * | 11/2016 | ........... | G03F 7/0002 |

OTHER PUBLICATIONS

Aksu et al (Flexible Plasmonics on Unconventional and Nonplanar substrates, Adv. Mater, 23, pp. 4422-4430, Oct. 11, 2011) (Year: 2011).*
International Search Report and Written Opinion for PCT Application No. PCT/GB2018/053323, dated Apr. 12, 2019.
Burch, James, et al.: "Conformable Holographic Metasurfaces", Scientific Reports, vol. 7, No. 1, Jul. 3, 2017 (Jul. 3, 2017), XP055552948, DOI: 10.1038/s41598-017-04482-2.
Genevet, Patrice, et al.: "Holographic optical metasurfaces: a review of current progress", Reports On Progress in Physics, Institute of Physics Publishing, Bristol, GB, vol. 78, No. 2, Jan. 22, 2015 (Jan. 22, 2015), p. 24401, XP020277783, ISSN: 0034-4885, DOI: 10.1088/0034-4885/78/2/024401 [retrieved on Jan. 22, 2015].
International Preliminary Report on Patentability for PCT Application No. PCT/GB2018/053323, dated Jun. 4, 2020.
Search Report from the Great Britain Intellectual Property Office for Great Britain Patent Application No. GB1719588.4, dated May 24, 2018.
Examination Report from the European Patent Office for European Patent Application No. EP18808080.8, dated Sep. 22, 2021.

* cited by examiner (a) (b)

(a) (b)

(a)          (b)

HOLOGRAPHIC DEVICE

This application is the U.S. National Stage of PCT International Application No. PCT/GB2018/053323, filed Nov. 16, 2018, which claims priority from Application GB1719588.4 filed on Nov. 24, 2017 in the United Kingdom. The entire disclosures of these applications are incorporated herein by reference in their entirety.

INTRODUCTION

The present invention relates to a holographic device, for example, a holographic security or identification device.

BACKGROUND

Counterfeiting is a longstanding problem. Counterfeiting may be carried out by unauthorized replication of a number of different objects including banknotes, medical or legal documents, packaging or a food or drink container, a bottle, a medicament or a medicament container or a pharmaceutical product.

Counterfeiting may be carried out on high value goods and it important to provide cost effective anti-counterfeiting measures to such goods. Known security features for preventing or detecting counterfeit objects include security tags, security printing, watermarks, holograms and ultraviolet features.

Counterfeiting techniques have become increasingly more sophisticated over time and research and development of anti-counterfeiting technology must keep track and attempt to outpace counterfeiting attempts. There is an ongoing need for more sophisticated anti-counterfeiting techniques.

Known surface topology sensors include optical based measuring techniques, electrically resistive techniques and contact based sensors. These sensors are expensive in the case of optically based devices, slow in the case of contact sensors, or can detect only stress/strain in the case of resistive type sensors.

SUMMARY

According to a first aspect of the present invention there is provided a holographic security or identification device comprising:
  an object, or a flexible substrate configured to be conformable to a desired, curved shape; and
  a plurality of structures formed on or in the object to have a desired curved configuration, or formed in or associated with the substrate and arranged to adopt a desired curved configuration when the substrate is conformed to a desired shape,
  wherein the plurality of structures are configured to receive light of a selected at least one wavelength or range of wavelengths and to produce, using the received light, a desired holographic image for security or identification purposes when in the desired configuration.

The desired holographic image may comprise at least one feature that comprises or represents an identifier.

The plurality of structures may be arranged such that distortion of the flexible substrate away from the desired curved shape causes a degradation of at least one property in the holographic image of said at least one feature that comprises or represents the identifier.

The plurality of structures may be such that if they have a configuration other than the desired configuration a degradation of at least one property in the holographic image of said at least one feature that comprises or represents the identifier is produced.

The configuration being different to the desired configuration may be due to inaccuracies in formation, or change, in at least one property of the object or the structures, or due a surface texture or topology on which the structures may be formed or attached being different to a desired surface texture or topology.

The at least one property of the holographic image of said at least one feature may comprise at least one of sharpness, noise, distortion, blur, contrast, position, shape, colour.

The structures may be arranged such that the desired holographic image may be obtained when the structures provide the desired curved configuration when arranged as or conforming to a layer or surface having a desired topology.

The desired topology may be characterized by a gradient that varies across the layer or surface.

The desired topology may have at least one curvature across the layer or surface.

The desired topology may have at least one, optionally two or more local maxima.

The desired topology may be at least one of: cylindrical, convex, concave.

The structures may be arranged such that the number of structures per unit area and/or the amount of information represented by the structures for portion(s) of the surface or layer having the desired topology varies in dependence on gradient and/or at least one other property of the surface or layer having the desired topology.

The structures may be arranged such that the number of structures per unit area may and/or the amount of information represented by the structures is greater for portion(s) of the surface or layer that have a higher value of gradient than for portion(s) of the surface or layer that have a lower value of gradient.

The object may comprise a rigid object and the structures may be formed on or in relation to at least part of the object, optionally a surface of the object, such that the structures form the desired holographic image if said at least part of the object has a desired shape.

The structures may be formed on or in relation to said rigid object by attachment or inclusion of the flexible substrate on or in the rigid object, for example by attachment of the flexible substrate to a surface of the rigid object.

The structures may be formed on or in relation to the rigid object, such that a measure of at least one property of said at least one feature of the holographic image provides a measure of accuracy of shape of said at least part of the rigid object, for example for quality control or anti-counterfeiting purposes.

The rigid object may comprise at least one of packaging, a food or drink container, a bottle, a medicament or a medicament container or a pharmaceutical product.

The object may comprise a flexible object and the structures may be formed on or in relation to at least part of the object, optionally a surface of the object, such that the structures form the desired holographic image when said at least part of the object is flexed to have the desired shape.

The structures may be formed on or in relation to said at least part of the object by attachment or inclusion of the flexible substrate on or in the flexible object and/or the flexible object may comprise the flexible substrate.

The structures may be arranged such that the structures form the desired holographic image when said at least part of the object is flexed to conform to a shape of a selected further object.

The selected further object may comprise a component of a banknote handling mechanism, or a document handling mechanism, an image handling mechanism, a paper- or plastic-sheet handling mechanism, and/or a packaging or container handling mechanism, and/or a scanner apparatus and/or a copier apparatus.

The selected further object may comprise at least one roller.

The structures may be configured to adopt a desired curved configuration when the substrate is subject to a desired tension and/or pressure and/or force.

The flexible object comprises at least one of: a banknote; or a document, for example a passport or other identification document or a medical or legal document; a photograph or other image; packaging; or a container.

For at least one, optionally all, of the structures, at least one dimension may be less than the selected wavelength(s), optionally all cross-sectional dimensions may be less than the selected wavelength(s).

The selected wavelength(s) may be in a range between 200 nm to 10 microns.

For at least one, optionally all, of the structures, at least one dimension may be in the range between 20 nm to 10 microns.

The structures comprise meta-atoms in 1 D, 2D or 3D, and/or the substrate or object comprises a metasurface.

The plurality of structures comprise at least one of: nanorods, high index dielectrics, nanofins, nanogaps, polymers comprising controllable refractive index, nanodisk resonators, split-ring resonators, nano-crosses and dot matrix diffraction gratings.

The device may include a protective layer to protect the structures. The structures may be formed using a printing process, optionally a roll-to-roll printing process.

The structures may form a phase modulation hologram and/or an amplitude modulation hologram.

The structures may form a reflection hologram or a transmission hologram.

The light may comprise or be coherent light.

The identifier may comprise at least one of letters and/or numbers and/or an image of an object and/or a graphical identifier, optionally a QR code or a bar code.

The identifier may be representative of the identity of the object or the device. The identifier may be representative of at least one property of the object or the device. The identifier may be representative of the identity or at least one property of an owner, user, manufacturer or retailer of the device or object. The identifier may be representative of at least the identity or at least one property of content stored by or contained in the object.

The plurality of structures may be further arranged to adopt a further desired configuration when the substrate may be conformed to a further desired shape, wherein the plurality of structures may be further configured to produce, using the received light, a further desired holographic image for security or identification purposes when in the further desired configuration.

According to a further aspect of the present invention, there is provided a method of producing a holographic or identification device comprising:

providing an object, or a substrate layer configured to be conformed to a desired curved shape;

providing a plurality of structures on or in the object to have a desired curved configuration, or in or associated with the substrate layer and arranged to adopt a desired curved configuration when the substrate layer is conformed to a desired shape, wherein the plurality of structures are configured to receive light of a selected at least one wavelength or range of wavelengths and to produce, using the received light, a desired holographic image for security or identification purposes when in the desired configuration.

According to a further aspect of the present invention, there is provided a method of using a holographic or security device, comprising providing light to a holographic or security device according to the first aspect of the present invention thereby to produce a holographic image and determining at least one property of the produced holographic image and/or a degradation of at least one property of the produced holographic image.

The method may further comprise comparing the produced holographic image to a target image.

The method may further comprise detecting the produced holographic image to produce a detection signal representative of the produced holographic image and processing the detection signal to determine at least one property of the produced holographic image and/or a degradation of at least one property of the produced holographic image.

The method may further comprise applying the holographic or security device to a surface.

According to a further aspect of the present invention, there is provided a system for security or identification comprising:

a holographic security or identification device according to the first aspect of the present invention;

a light source configured to produce light of a selected at least one wavelength or range of wavelengths.

The system may further comprise a detector for detecting the produced holographic image thereby to produce a detection signal representative of the produced holographic image.

The system may further comprise a processing resource for processing the detection signal representative of the produced holographic image to determine at least one property of the produced holographic image and/or a degradation of at least one property of the produced holographic image.

The apparatus may further comprise an apparatus for handling banknote or other document for use with a banknote or other document handling mechanism comprising a holographic security or identification device according to the first aspect of the present invention, wherein the apparatus comprises:
one or more light sensors;
a roller comprising a curved surface corresponding to the desired, curved shape of the device; and
a laser or other coherent light source configured to produce light and direct the produced light towards the roller, such that, in operation, the banknote or other document produces the desired holographic image using light from the laser and the one or more sensors detect the produced holographic image to authenticate the banknote or other document.

According to a further aspect of the present invention there is provided a method of retrofitting a banknote handling apparatus for use with a banknote comprising a holographic security or identification device as claimed in any of the preceding claims, wherein the banknote handling apparatus comprises a roller comprising a curved surface corresponding to the desired, curved shape of the device, and wherein the retrofitting comprises:

providing or configuring a processing resource to determine at least one property of a produced holographic image and/or a degradation of at least one property of a produced holographic image.

Retrofitting may further comprise:

providing a laser or other coherent light source configured to produce light and direct the produced light towards the roller, such that, in operation, the banknote produces the desired holographic image using light from the laser.

Retrofitting may further comprise providing one or more sensors to detect the produced holographic image to produce a detection signal representative of the holographic image.

Features in one aspect may be applied as features in any other aspect. For example, method features may be applied as apparatus features and vice versa.

BRIEF DESCRIPTION OF THE DRAWINGS

Various aspects of the invention will now be described by way of example only, and with reference to the accompanying drawings, of which.

DETAILED DESCRIPTION OF THE DRAWINGS

Figure 1:
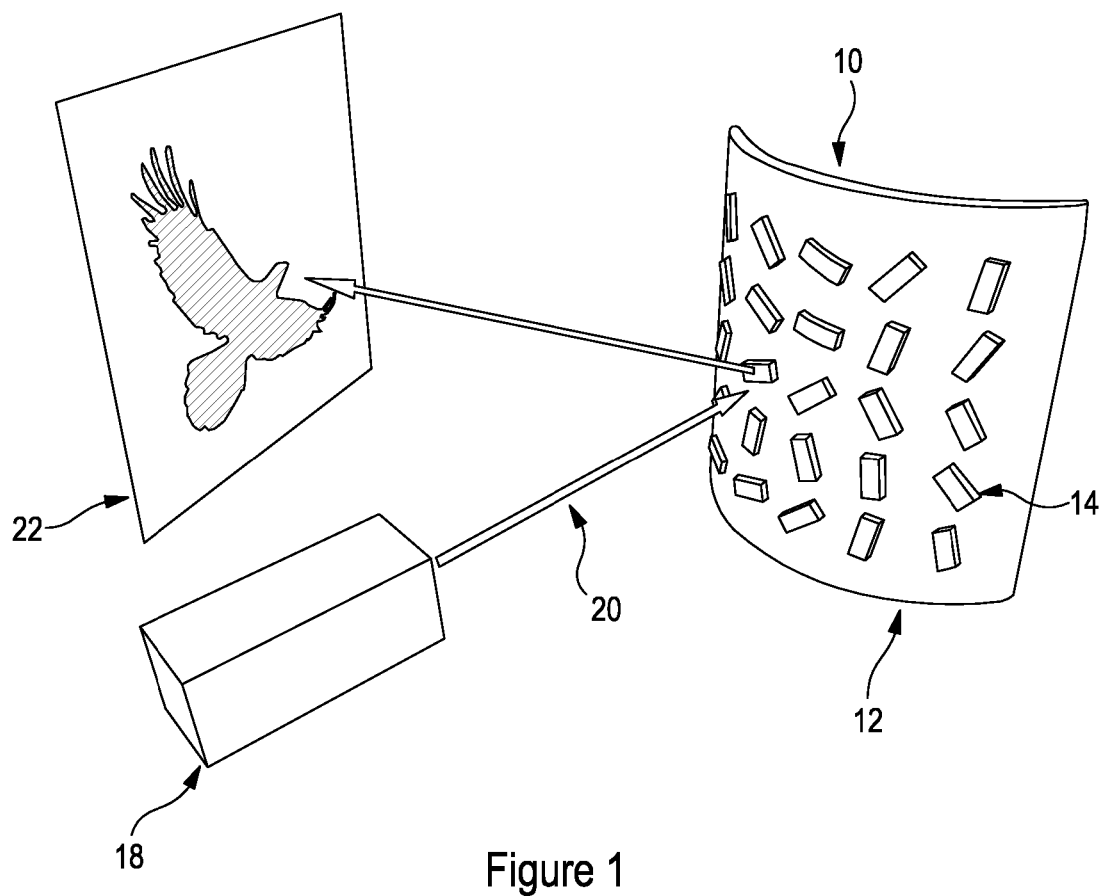
FIG. 1 is a perspective view of a holographic device.

FIG. 1 shows a holographic device 10 used for security and identification purposes. The device 10 comprises a substrate 12 and structures 14 formed on the substrate 12. The substrate 12 is flexible and conformable to a desired shape. In FIG. 1, the desired shape is the shape of a surface of a cylindrical object (not shown). FIG. 1 also shows a light source, for example a laser 18, for producing light 20. The light source has sufficient spatial, and temporal coherency for holography. The produced light 20 is incident on the device 10 and a holographic image 22 is produced by the structures 14 of the device 10 using the incident light 20. The holographic image 22 can be used for identification, authentication, monitoring or security purposes. For these purposes, the holographic image 22 may have one or more features that represent or comprise an identifier. The quality of the produced holographic image 22 is dependent on the shape of the substrate 12 when the light is incident on the device 10.

The structures 14 are arranged on the substrate 12 such that they adopt a desired configuration, also hereby referred to as a curved configuration, when the substrate 12 is conformed to the desired shape, in this example, the desired shape is the curved shape of the outer surface of the cylindrical object (not shown). By deforming the substrate 12, through flexing or otherwise, the structures 14 are moved relative to each other and thereby adopt different configurations. The structures 14 are configured to receive light and produce the holographic image 22. The quality of the holographic image produced is dependent on the configuration adopted by the structures 14.

The substrate 12 and structures 14 form a flexible holographic metasurface. The structures 14 are sub-wavelength structures, for example, meta-atoms. The meta-atoms may have more than one sub-wavelength dimension, for example, a thickness, width or length. The meta-atoms may be formed in one, two or three dimensions. Due to the sub-wavelength thickness, the structures 14 are able to impose abrupt phase changes on incident light. A phase profile is encoded into the substrate 12 using the structures 14.

The structures may be formed on or in the substrate. Alternatively, the structures may be formed on or in the object, including directly on or in the object. The object may be non-rigid or may be rigid.

The desired shape may be a curved shape or any other suitable topology. A non-limiting example described herein is a cylindrical surface. The device may be applied to the outer or inner surface of the cylindrical surface. The surface may be either convex or concave. Other desired shapes include, for example, spherical, or any suitable bottle shape. The device may be applied or conform to a surface of part of a bottle or other container. The bottle or container surface may have a corner. The corner may be a rounded corner. The device may be conformable to a corner or to cover an edge of an object.

In some embodiments, the desired shape includes one or more surface deformations, for example, one or more protrusions and/or depressions. For example, the desired shape may be a substantially curved shape with an extra protrusion provided thereon. In another example, the desired shaped is substantially flat or planar, and the desired shape includes one or more protrusions and/or depressions. The desired shape may have one or more local maxima, or minima.

As described above, when placed into a different configuration that does not correspond to the curved configuration, the structures 14 can still receive light and produce a holographic image. However, the holographic image produced in the different configuration is of a lower quality than the holographic image produced in the curved configuration. The quality of the image is manifest or measurable by a degradation in at least one property in the holographic image. For example, the holographic image may show degradation in one or more of sharpness, noise, distortion, blur, contrast, position, shape and colour.

In use, as a first example, the device 10 is applied to the object such that the device 10 conforms to the cylindrical shape of the surface of the object. By conforming the substrate 12 to the object, the structures 14 adopt the curved configuration. Light 20 having a first selected wavelength is produced by laser 18 and directed towards the device 10. The light 20 is incident on the structures 14 in the curved configuration. The structures 14 receive the light 20. The structures 14 in the curved configuration and the substrate 12 reflect and manipulate the received light to form a high quality, undistorted, holographic image 22.

As a second example, the device 10 is applied to a second object (not shown) that has a surface with a shape different to the cylindrical shape of the object. For example, the second object may have a surface that has a substantially flat shape, or may be a cylindrical shape characterized by a different curvature to the curvature of the object. As the substrate 12 is flexible, it can be flexed in an attempt to conform and fit to the surface of the second object. In other words, the substrate 12 of the device 10 is deformed to a shape that is not the same as the desired shape. Thus the structures 14 adopt a different configuration.

In the second example, light 20 having a first selected wavelength is produced by a laser 18 or other suitable light source, and directed towards the device 10. The light 20 is incident on the structures 14 in the different configuration. The structures 14 receive the light 20. The structures 14 in the different configuration and the substrate 12 reflect and manipulate the received light to produce a degraded or distorted holographic image (not shown).

By deforming the device 10 such that the structures adopt a configuration that is not the desired curved configuration, a degradation in the produced holographic image occurs. The degradation may manifest as a degradation in a property of a feature of the image.

Figure 2A:
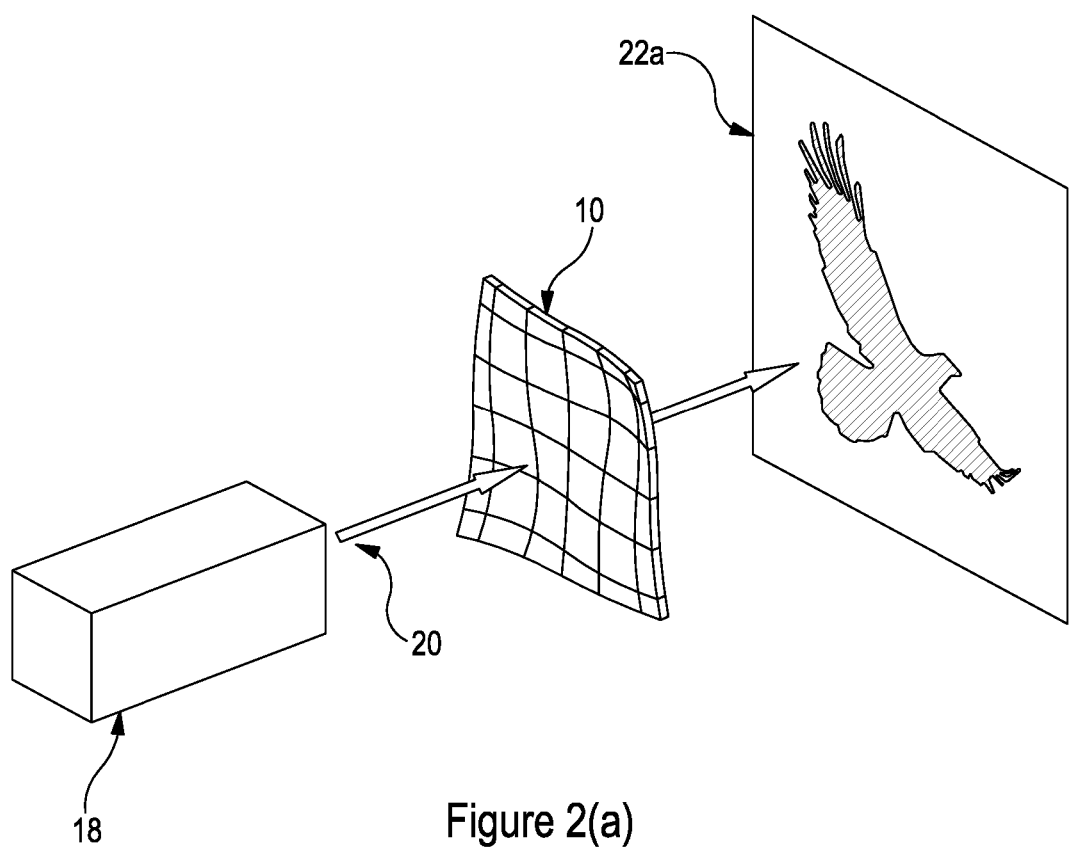
FIG. 2(a) is a perspective view of a holographic device in a first configuration and FIG. 2(b) is a perspective view of a holographic device in a second configuration.
Figure 2B:
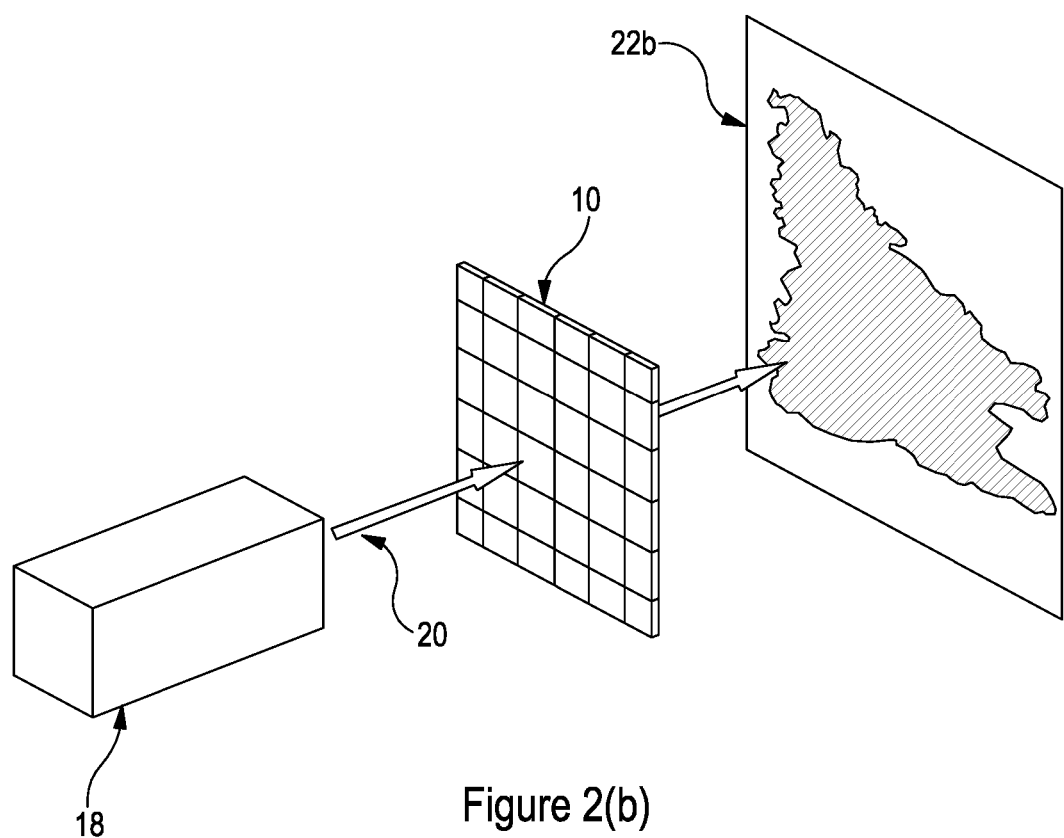

FIGS. 2(a) and 2(b) show a further example of deformation of the holographic device 10 and the effect of deformation on the produced holographic image. As discussed elsewhere, the holographic device 10 may operate using transmission or reflection of light. For illustrative purposes, a transmission device 10 is shown in FIGS. 2(a) and 2(b), in contrast to the reflection device 10 shown in FIG. 1.

As shown in FIG. 2(a) the device 10 is deformed or otherwise placed into its desired curved shape. The structures 14 thereby adopt a desired curved configuration. Light 20 having a first selected wavelength is produced by laser 18 and directed towards the device 10. The light 20 is incident on the structures 14 in the curved configuration. The structures 14 receive the light 20. The structures 14 in the substrate 12 manipulate the received light as it passes through the substrate 12 to form a high quality, undistorted, holographic image 22a.

As shown in FIG. 2(b) the device 10 is deformed or otherwise placed into a configuration that is not its designed curved shape. In this case, the device 10 is substantially flat. The structures 14 adopt a different configuration from the curved configuration of FIG. 2(a). Light 20 having a first selected wavelength is produced by the laser 18 and directed towards the device 10. The light 20 is incident on the structures 14 in the different configuration. The structures 14 receive the light 20. The structures 14 in the different configuration manipulate the received light as it passes through the device 10 to produce a degraded or distorted holographic image 22b.

The device 10 can be used for identification purposes. The structures 14 may adopt a configuration that is not the desired configuration due to substrate being applied to the wrong shape, for example, when applied to an object. For example, a device 10 may be manufactured so that the structures 14 of the device adopt the desired configuration only if the device 10 is applied to a certain shape, for example, the shape of a surface of an object to be authenticated. Should the device be applied to another object, the structures will not adopt the desired configuration and therefore the other object is not authenticated or identified.

The device can be used for monitoring purposes, in particular for monitoring changes and degradation of an object over time. As one example, a part of an object or structure may be monitored by applying or attaching the device to the part. For example, a part of a large engineered structure may be monitored, for example a bridge stanchion or strut. In another example, a part of a vehicle may be monitored, for example, a part of a car or aeroplane. Changes and degradation to the part can be monitored by determining the quality of the image produced by the device over time and/or the changes to the quality of the image produced by the device over time or the changes to a property representative of the quality of the image. A measure of degradation of the image produced can provide an indication of the condition of the part being monitored. The device may provide an easy, cheap sensor for monitoring.

For monitoring of large scale structures, a surface can be covered by tiling more than one holographic surfaces. As a non-limiting example, each holographic surface may be up to 10 cm in size, per side. Holographic images are detected using detection techniques as described elsewhere for each holographic tile. The minimum change of curvature that we would be able to detect is approximately comparable to the length of the holographic surface. In this example, the change of curvature is 10 cm.

The device can be used for quality control or authentication purposes. As one example, a model object may be manufactured to certain pre-determined dimensions. In a manufacturing process, copies of the model object are created. A device is then manufactured and configured such that the structures thereof adopt a desired configuration when the device is attached to a certain surface of the model object. A quality control test process can be carried out that involves applying the device to copies of the model object to determine whether or not they are built to the same standard or dimensions as the model object. A difference in one or more properties of the surface of the copy of the model object due to inaccuracies in formation or manufacture may cause the structures to adopt a different configuration to the desired configuration thus producing a degraded image. A different configuration may be also be adopted due to a decay or a change in one or more properties of an object under test. The device may also be configured to adopt a different configuration if a surface texture or topology on which the structures are formed or attached to is different to a desired texture or topology. A measure of degradation of the image produced can provide an indication of accuracy of the manufacturing process.

In some embodiments, the holographic image 22 is detected by a suitable detector (not shown) configured to convert the light making up the produced hologram image into one or more detection signals. Associated detection signal processing circuitry (not shown) is also provided to process the detection signals. The level of distortion of the image can be quantified. Processing of the detection signal can include comparing the produced holographic image to a high quality representation of the same image. Processing of the detection signal can include determining the degradation of the image and/or the difference in quality between the produced image and the high quality representation. The measure of degradation and difference in quality may be quantified by comparing one or more properties of one or more features, or of the images as a whole, of the produced image and the high quality image.

By quantifying distortion, a measure of how close the substrate is to its desired shape is determined thereby allowing manufacturing tolerances and/or other measuring uncertainties, for example, systematic or random errors, to be taken into account in an identification, authentication or security process.

FIG. 1 shows a holographic image 22 produced by reflection of light. The light used is coherent light, for example, light from a laser. In some embodiments, the holographic image is produced by transmission of light, for example, the device of FIG. 2. Using a reflection hologram increases the sensitivity of the device to the shape or topology of the object, relative to observing the hologram in transmission. In reflection, as described with reference to FIG. 1, the light interacts with the structures 14 of the device at least twice: firstly as it is passes through the structures 14 and secondly as it is reflected by the substrate and then passes back through the structures 14. In transmission, the light passes through, and thus interacts with, the structures 14 once. The device 10 is therefore capable of being a transmission or a reflection hologram.

A reflection hologram may offer advantages over a transmission hologram. The efficiency of a reflection hologram may be improved over a transmission hologram due to multiple reflections between the reflective backplane and the structures 14. Even if light isn't converted to the correct phase and handedness on its initial pass through the surface with structures formed on it, the light may be converted on subsequent passes. Therefore, the light probes the shape and topology of the surface at least twice. This geometry is commonly known as a Fabry-Perot cavity.

A reflection hologram may also be more sensitive to topology deformations than a transmission hologram. This can be described by considering a reflection device and a transmission device both designed to be deformed into a curved shape from a substantially flat shape, where the device produces an undistorted image when deformed to its curved shape. For both devices, for a given point along the surface of the device, the distance light travels from that point on the surface of the device to the holographic image can be measured. For most points on the surface, this distance varies depending on if the device is in its curved shaped and the flat shape. For the reflection device, this distance may vary by twice as much as for the transmission case, due to the reflection of light. Therefore, the sensitivity in the reflection case is increased.

In some embodiments, the holographic device is designed to work at one wavelength. In other embodiments, the holographic device is designed to work at a plurality of wavelengths, for example, more than one discrete wavelengths or over a spectrum of wavelengths. By using a plurality of wavelengths, it is possible to produce a holographic image having more than one colour. In some embodiments, the hologram is a wavelength multiplexed hologram such that the holographic image varies in dependence on the wavelength of the incoming light.

Figure 3:
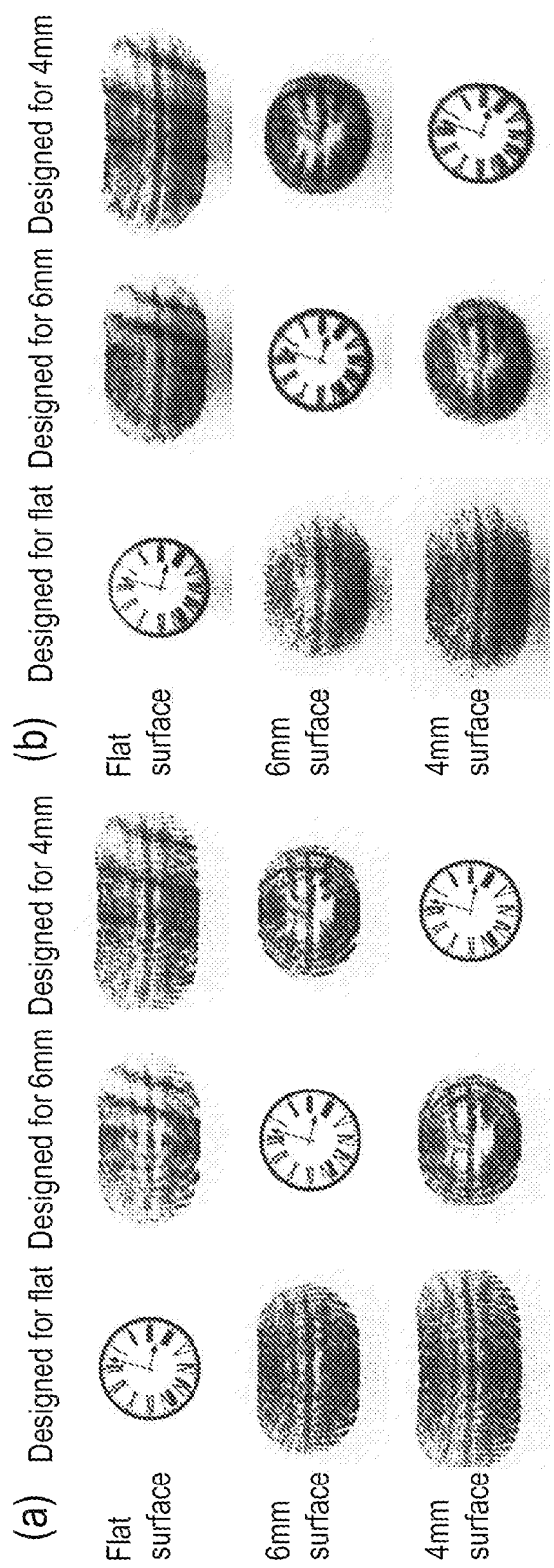
FIG. 3 shows experimental and simulated holographic images.

FIG. 3 shows examples of produced holographic images. FIG. 3(a) shows simulated images and FIG. 3(b) shows experimental images that are produced by three different holographic devices when placed on different shapes of surface. Each column of FIG. 3(a) and FIG. 3(b) shows three holographic images produced through simulation and experimentation, respectively, by different holographic device applied to different shapes.

The left hand column shows three images produced by a device designed to be conformed to a flat surface. The central column shows three images produced by a device designed to be conformed to a convex cylindrical shape with radius of curvature of 6 mm. The right hand column shows three images produced by a device designed to be conformed to a convex cylindrical shape with radius of curvature of 4 mm.

The upper row of images are holographic images produced by each of the three devices when applied to a flat surface. The first device produces a sharp holographic image. The sharp images produced in FIG. 3(a) and FIG. 3(b) are clear and un-distorted. The second and third devices produce degraded holographic images.

The central row of images are holographic images produced by each of the three devices when applied to a surface having a convex cylindrical shape with radius of curvature of 6 mm. The second device produces a sharp holographic image. The first and third devices produce degraded holographic images.

The lower row of images are holographic images produced by each of the three devices when applied to a surface having a convex cylindrical shape with radius of curvature of 4 mm. The third device produces a sharp holographic image. The first and second devices produce degraded holographic images.

The level of degradation or image distortion can be quantified by using a correlation coefficient. Identical images have a correlation value of 1 and completely dissimilar images have a correlation value of −1. Table 1 shows correlation values for the simulated images shown in FIG. 3. The correlation values are measured by comparing each simulated image against a target image. A similar comparison can be completed using the experimentally obtained images.

TABLE 1

|  | Designed for Flat | 6 mm | 4 mm |
| --- | --- | --- | --- |
| Flat surface | 0.9635 | 0.3439 | 0.2975 |
| 6 mm surface | 0.3570 | 0.9640 | 0.4518 |
| 4 mm surface | 0.3003 | 0.4458 | 0.9652 |

As a non-limiting example for quantifying image degradation, the correlation coefficient rescales pixel intensity values from the range 0 to 255 to a range −1 to 1. A pixel by pixel comparison between the two images is performed. The pixel by pixel comparison includes taking a dot product of the pixels. The dot product of all these individual pixels is summed to provide a value representing the similarity of the two images.

Many other methods of comparing images exist including: Structural SIMilarity (SSIM), Mean-Squared Error (MSE), Peak Signal-to-noise ratio (PSNR), and Visual Information Fidelity (VIF). Other specialized methods for image comparison include using the sharpness, contrast, noise, dynamic range, tone reproduction, color accuracy, artifacts.

The experimental images were obtained by conforming the devices to, a flat silicon surface, and two glass cylinders with radii of curvature of 6 mm and 4 mm respectively. A screen was placed 80 mm away from the device above the incident beam to display the far field image and pictures were taken with a standard camera with $\lambda$=630 nm.

It is observed, from FIG. 3 and from Table 1 that the quality of the far field image is greatly degraded when the device is conformed to a surface geometry that it was not designed for.

FIGS. 1, 2 and 3 relate to a substrate conformable to a cylindrical shape. The shape or topology that the substrate is conformable to may be arbitrarily complex. Aside from choosing between reflection and transmission holograms, the sensitivity of the device or how much the holographic image degrades when deformed or moved from the desired shaped may be controlled using a number of design parameters.

A non-uniform topology over the area of the metasurface may lead to an increase in sensitivity. In particular, an increase may be observed if the non-uniformity is on a scale comparable with the smallest unit (pixel) of the metasurface. In this condition, for a given metasurface resolution, also referred to as pixel pitch or the spacing between individual structures on the metasurface, the complexity of the information encoded in the metasurface increases with its absolute size. If a structure or surface perturbation is small relative to the area of the metasurface, the hologram is not sensitive to deformations.

Therefore, choosing a very irregular and large surface topology may lead to a more sensitive device. For simpler, specific surface shapes, the metasurface can be made more sensitive through concentrating encoded information on the parts that are more perturbed. For example, for a cylindrical shape, the information can be encoded on the sides of the substrate, rather than in its center. Additionally, for holograms formed at the same z (the distance from the device to the holographic image) smaller images are more sensitive to topology deformations.

In FIG. 3, the target image used is an example target image of a clock. The device can be formed to produce different holographic images. For security and identification purposes the device can be formed such that the holographic image produced by said device has a feature that represents an identifier. In some embodiments, the feature comprises an identifier.

The identifier can be any suitable identifier. For example, the identifier may be made up of a combination of letters and/or numbers and/or an image of an object. The identifier may be any graphical identifier. The identifier may be machine readable. Of particular interest for identification and security purposes is an identifier that includes a tag, for example, a machine-readable tag. This could be a QR code, or other graphical code, for example, a barcode.

The identifier may represent more information about the device itself or the object to which the device is secured, for example, the identity or at least one property of an owner, user, manufacturer or retailer of the device or object, or the identity or at least one property of content stored by or contained in the object.

Figure 4:
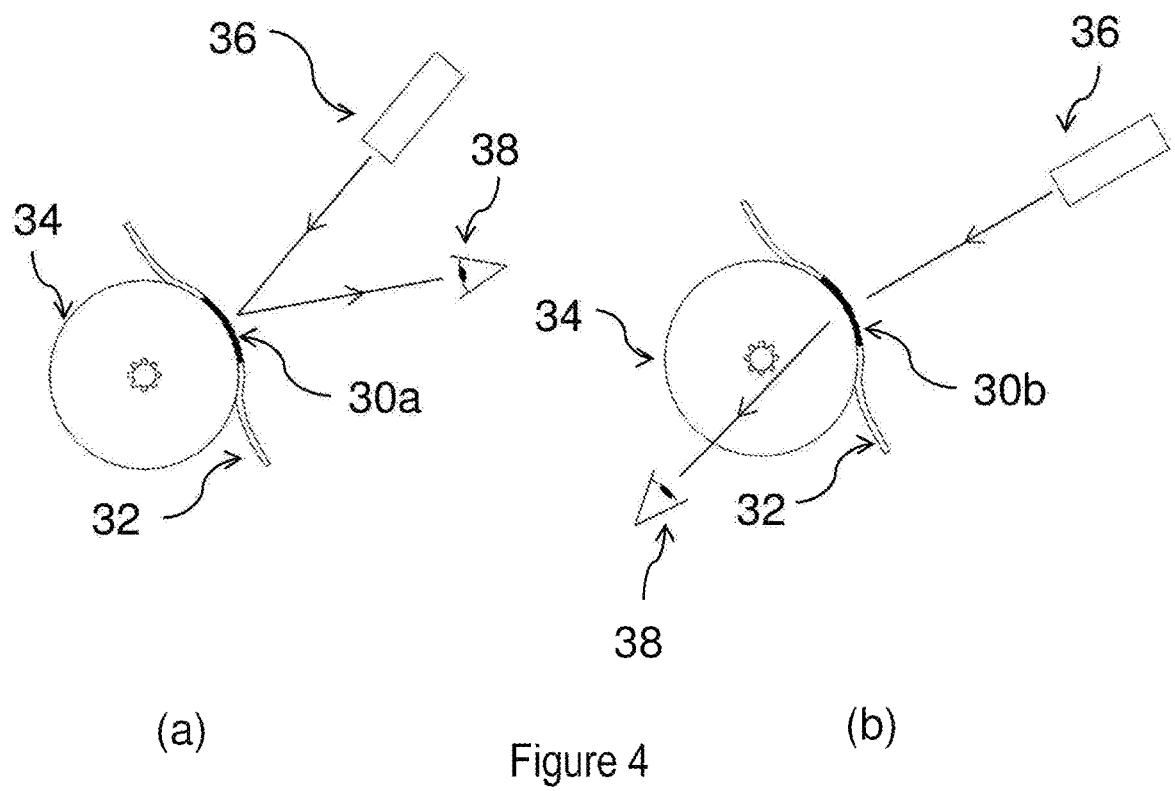
FIG. 4 is a schematic diagram of embodiments of the holographic device.
Figure 5:
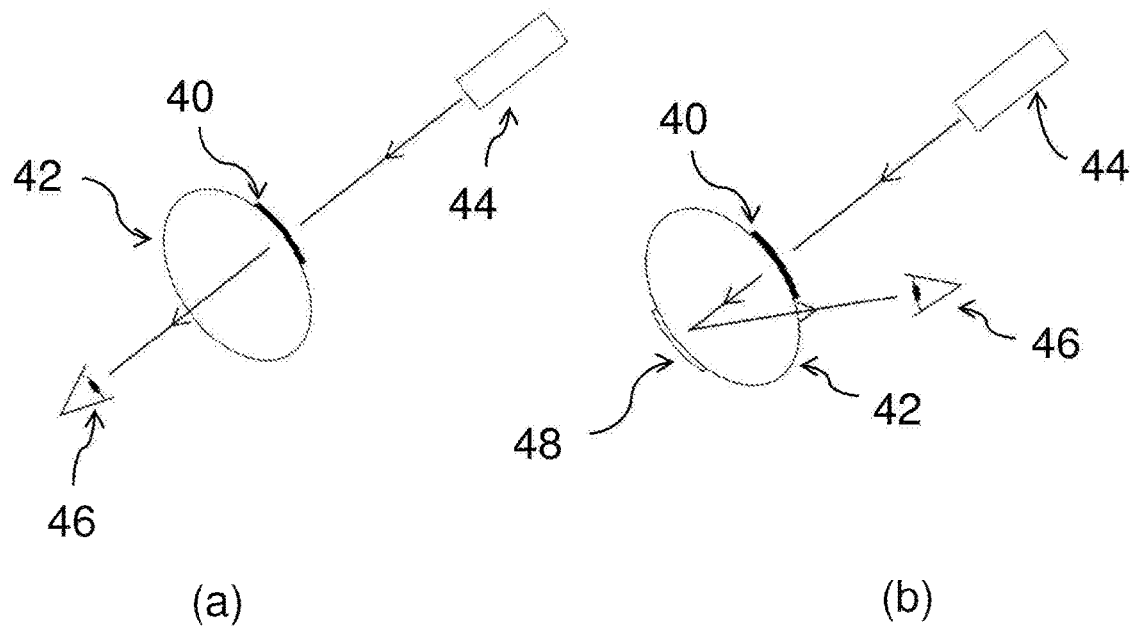
FIG. 5 is a schematic diagram of further embodiments of the holographic device.
Figure 6:
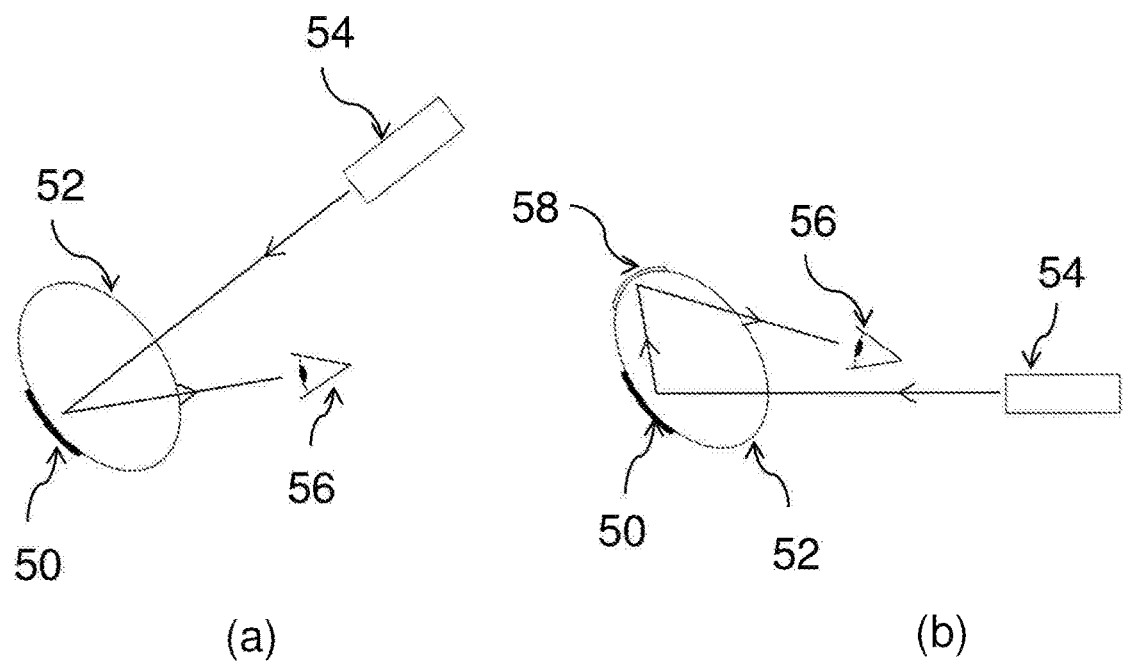
FIG. 6 is a schematic diagram of further embodiments of the holographic device.

Different embodiments of the holographic device 10 are now considered, as shown in FIGS. 4, 5 and 6. FIG. 4 shows two devices 10 embedded into a flexible object such that the flexible object is then conformed to a surface of a further object; FIGS. 5 and 6 shows devices that are attached to a rigid object, operating either by transmission of light or by reflection of light.

FIG. 4 shows a holographic device, denoted by 30a, 30b in FIG. 4(a) and FIG. 4(b) respectively, attached to an outer surface, or embedded within the, flexible object 32. The flexible object 32 is conformable to the shape of a further object 34. The device is also flexible and therefore flexes together with the flexible object 32. In FIG. 4(a) the device 30a uses a reflection hologram and in FIG. 4(b) the device 30b uses a transmission hologram. As an example, the further object 34 is represented in FIG. 4(a) and FIG. 4(b) as a roller. A cog is shown as part of the roller.

The holographic device or the structures thereof may be attached or embedded into any flexible object 32. The flexible object 32 and structures are formed such that structures of the device adopt the curved configuration and can form the desired holographic image when the flexible object 32 is flexed, in particular, when the flexible object 32 is conformed to the shape of the further object 34.

One particular application of the embodiment of FIG. 4 is in cash handling methods, where the flexible object 32 is a banknote, and the roller 34 is a cylindrical roller of a banknote handling mechanism. In an example embodiment, the flexible object 34 is a banknote and the further object 34 is a cylindrical roller of a banknote handling mechanism. The banknote handling mechanism may be a known system. The roller 34 receives the banknote from another component of the banknote handling mechanism during a cash counting, cash depositing or cash withdrawal process. As part of this process the banknote is conformed to the shape of the roller 34 such that the structures of the device attached to the banknote adopt the curved configuration when the banknote is conformed to the shape of the roller. The banknote handling mechanism may have one or more further components configured to flex or otherwise handle the banknote.

In use, light from the laser 36 is incident on the device 30a and is manipulated and reflected by the device 30a such that a holographic image is produced and detected by a detector 38. The detector 38 could be a human eye, a charge couple device, a camera or other light detector suitable for detecting the light of the holographic image. For the reflection holographic device 30a, the detector 38 is positioned at a reflection angle, which can be controlled when manufacturing the device. Processing circuitry may be provided as part of the detector, or associated with the detector, to process detection signals.

FIG. 4(b) shows an alternative embodiment to FIG. 4(a). A difference between FIG. 4(a) and FIG. 4(b) is that the device 30b of FIG. 4(b) is a transmission hologram. The detector 38 is thus positioned at an opposite side to the laser 36. In this case, the further object 34, to which the flexible object 32 is applied, must be capable of allowing light to pass through so that light can be transmitted from the laser 36 to the detector 38. This can be achieved by providing a further object 34 that is transparent, or at least partially transparent. Alternatively, the further object 30 may include one or more window regions. In alternative embodiments, the detector 38 may be placed inside the further object 34. For the transmission holographic device 30b, the detector 38 is positioned at a deflected position. The deflection position of FIG. 4(b) is off-set from a $0^{th}$ order, non-deflected beam. However, a non-zero deflection position is shown for clarity. The deflection angle may be zero.

As described above, the system shown in FIG. 4 may correspond to a banknote handling mechanism. This can be achieved by retrofitting an existing, known, cash handling machine. For example, a suitable light source of the cash handling machine may be used as the light source 36 and/or a detector or camera of the cash handling machine may be used as the detector 38.

The device attached to the object can be used to automatically ascertain authenticity of banknotes using standard known currency counting machinery. The hologram is designed, so that a non-degraded image is produced when the banknote is conformed to the cylindrical roller of the machines to provide a high level of selectivity.

The device is illuminated from outside the roller, and the produced holographic image is analysed. The produced holographic image can be authenticated by eye, or by an image reader. For example, the holographic image can be a QR code and the image reader can be a QR code reader allowing a binary "yes" or "no" signal to be generated by successful or unsuccessful authentication, respectively.

Alternatively, the holographic image may take the form of a barcode or other suitable identifier.

The holographic image may contain, as part of the identifier, further information about the object 32 or device. For the banknote example, the further information could include further security information, value, age, manufacturer, retailer, user, owner or any other banknote property.

Alignment between laser source 36 and either the device 30a or the device 30b may not be as stringent and may be less demanding than the existing positional accuracy required of a banknote in a currency counting machine. For a hologram with dimensions 0.75×0.75 mm$^2$ designed for a 6 mm radius of curvature for a far field with a size of 30×30 mm$^2$, 80 mm away from the hologram and 35 mm above the illuminating beam, deviations of less than 1 mm in the radius of curvature of the substrate are sufficient to produce a highly distorted image.

The device 30a, 30b may not conform properly to the roller if the banknote has a permanent fold in it. However, this problem is less likely to occur with modern polymer banknotes. A further mitigation of this risk is to provide an extra component of the machinery to apply a small amount of tension to the ends of the banknote to reduce the possible creases.

Known machines and apparatus for depositing banknotes (cash and deposit machines also referred to as CDM) have an array of in-built sensors. These sensors are physical sensors including: LVDT (linear variable differential transformer) related technologies for measuring the thickness of a note; GMR (giant magneto-resistance) sensors to read magnetic inks; optical sensors based on miniaturised digital cameras, some of which include fluorescent inks which glow when illuminated with UV light.

Existing digital cameras and/or existing processing resources present in known CDMs could be used to detect the holographic images from devices on banknotes. A laser can be added to existing CDMs where required. Modern lasers have small form factors, for example, a laser diode based laser and CDMs have a modular nature. Therefore retro-fitting current CDMs may be straightforward.

While FIG. 4 shows the object conforming to a convex cylindrical shape, in particular an object 34 that curves out towards the laser source, other shapes and arrangements are possible. For reflection holograms, the angle of reflection and thus the distance between the laser and detector can be controlled through the arrangement of the structures on the device.

The detector and associated circuitry could comprises a QR code reader and the holographic image could be a QR code. A QR code reader has an intrinsic sensitivity to clarity of a produced QR code that can be utilized. This could be done arbitrarily quickly as the limitations are the speed of the QR code reader and the speed that the currency counting machine can work at. Automatic authentication of banknotes can therefore be implemented.

An embodiment has been described in which the flexible object is a banknote, however, the device or structures may be embedded into any suitable flexible object. For example, the flexible object may be at least one of: a banknote; or a document, for example a passport or other identification document or a medical or legal document; a photograph or other image; packaging; or a container. In other embodiments, the further object can be one of: a document handling mechanism, an image handling mechanism, a paper- or plastic-sheet handling mechanism, and/or a packaging or container handling mechanism, and/or a scanner apparatus and/or a copier apparatus.

FIG. 5 shows a holographic device 40 attached to or included in a rigid object 42. A laser 44 produces light that is incident on the holographic device 40. FIGS. 5(a) and 5(b) show a transmission mode holographic device. A detector 46 is provided as described in FIGS. 4(a) and 4(b).

In use, light from the laser 44 is incident on the device 40, and is manipulated and transmitted by the device 40 such that it travels through the rigid object 42, thereby producing a holographic image. The holographic image is detected by a detector 46. The detector 46 is positioned on an opposing side of the rigid object 42 to the laser 44.

FIG. 5(b) has an additional reflective screen component 48 provided on the rigid object 42, at an opposite side of the rigid object 42, along a direction of propagation of the laser light. In use, the holographic image produced by the device 40 is therefore projected onto screen 48 and the light of the holographic image is reflected. The detector of FIG. 5 is positioned on the same side as the laser 44. The detector 46 is directed to face towards the screen component 48, to detect the holographic image projected thereon.

FIG. 6(a) and FIG. 6(b) show a holographic device 50, provided on a rigid object 52. While FIG. 5 shows the device attached to the rigid object such that the device is on a convex surface such that the device is curved towards the laser source 44, FIG. 6 show a device attached to a rigid object such that the device is on a concave surface such that the device is curved away from the laser source 54. In contrast to FIG. 5(a) and FIG. 5(b), the device 50 operates by reflection of light. In contrast to FIG. 5, the side of the device 50 that receives light is the inner surface of the device when applied to the rigid object 52.

In use, light from the laser 54 is incident on the device 50, and is manipulated and reflected by the device 50 such that a holographic image is produced and detected by a detector 56. In FIG. 6(a) the detector 56 and laser source 54 are provided on the same side of the rigid object 52, which in turn is an opposing side of the rigid object to the position of the device 50.

FIG. 6(b) shows a reflective screen component 58 provided on another side of the rigid object 52 than the device 50. The holographic image produced by the device 50 is projected onto the screen component 58, and reflected towards detector 56. The screen component 58 could be an internal surface of, for example, a label on the rigid object.

Although FIG. 5 and FIG. 6 show a holographic device attached to a rigid object, the structures may be formed on or in relation to the rigid object. For example, the structures may be formed directly on the rigid object. Alternatively, the flexible substrate itself may be included in the manufacture of the rigid object.

As described above, the holographic device produces a holographic image. A measurement of one or more properties of the holographic image allows a measure of the accuracy of shape of the rigid object. In this way, the holographic device can be used for quality control or anti-counterfeiting purposes.

The rigid object may be at least one of packaging, a food or drink container, a bottle, a medicament or a medicament container or a pharmaceutical product. In some embodiments, the holographic device may form part of a label. In some embodiments, the screen may provide part of a label.

One specific method of designing a holographic metasurface of a particular surface topology uses the Gerchberg-Saxton algorithm and the modified Kirchoff equation, as described in elsewhere. In one example of using the Gerchberg-Saxton algorithm, a holographic image is designed to be 80 mm away from the metasurface in an area of 30×30 mm² centered 35 mm above the zeroth order of the beam. A resolution in far-field is chosen. In this case, the resolution was chosen to be 183×183 pixels to allow a fast computation speed whilst retaining an acceptable resolution.

Modification to these design parameters is possible. For example, the distance of holographic image from the metasurface can be modified, as can the area occupied by the holographic image. The resolution and angle of reflection can also be selected. The number and position of each de-phasing element of the metasurface and then the position and resolution of the far field image and also the wavelengths for the incident light may also be used as design parameters. The directivity of the metasurface may also be used.

Figure 7:
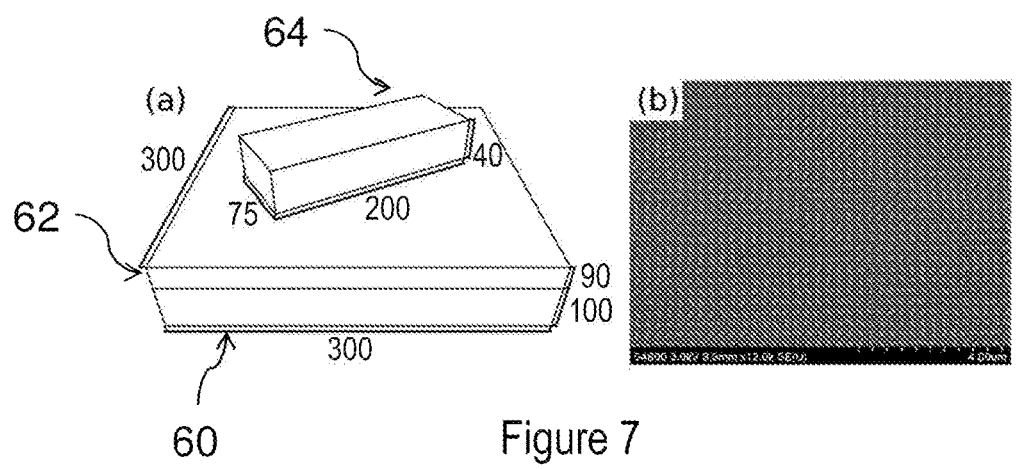
FIG. 7(a) shows a perspective view of a meta-atom and FIG. 7(b) shows a pattern of meta-atoms on a substrate.

FIG. 7 shows an example of a metasurface (MS) structure. FIG. 7(a) show a meta-atom formed out of a reflective layer 60, a spacing layer 62 and a gold nanorod 64. The reflective layer is a reflective gold backplane. The spacing layer 62 is a dielectric spacing layer. All units shown in FIG. 7(a) are in nanometres (nm).

FIG. 7(b) shows an image of a metasurface obtained using a scanning electron microscope. The image shows the metasurface after lift-off (see method of manufacture below) from its original silicon substrate after being adhered to another silicon substrate. FIG. 7(b) shows the individual nanorods formed on the substrate.

FIG. 7(a) and FIG. 7(b) show one example of a metasurface structure suitable to form part of the holographic device. Other methods of producing a metasurface may be used to form part of the holographic device.

The wavelength of light to be used by the metasurface also has to be selected.

Wavelength $\lambda=630$ nm was selected, as the metasurface is efficient at this wavelength and the human eye is sensitive at this wavelength. The image area was placed away from the zeroth order to minimize problems with the light unconverted by the metasurface.

To experimentally demonstrate topology specific metasurface holograms, geometric Berry de-phasing is leveraged through control of angle of gold nanorod antennas. Each nanorod acts as a half waveplate where a nanorod angle of $\theta(x_N, y_N)$ imparts a de-phasing of $\pm 2\theta(x_N, y_N)$ upon circularly polarized light where + and − represent right handed (RCP), and left handed (LCP) circularly polarized light respectively. A three layer reflective type geometry is chosen to increase efficiency and limit dispersion by forcing multiple passes through the nanorods in a Fabry-Perot type geometry. The scheme chosen is shown in the SEM image of FIG. 7(b). The nanorods in the metasurface have dimensions of 200×75×40 nm³ with a spacing between them of 300 nm. In total we used 2501×2501 nanorods to realize our phase distribution giving a total MS area of 0.75×0.75 mm².

There exist many different ways to create holograms, using a variety of physical effects, geometries and materials. In some embodiments, the metasurface use structures that are small metallic nanorods, and their orientations are chosen to control the phase of light in each point of the metasurface. In some embodiments, the structures form a phase modulation hologram. In some embodiments, the structures form an amplitude modulation hologram. In some embodiments the structures form a phase and amplitude modulation hologram. In some embodiments, the hologram is a polarisation hologram such that the holographic image varies in dependence on the polarisation of the incoming light.

Other materials suitable to control phase of light and therefore produce holograms include, for example, high index dielectrics, nanofins, nanogaps, polymers comprising controllable refractive index, nanodisk resonators, split-ring resonators, nano-crosses and dot matrix diffraction gratings.

The device may be implemented using many different materials and thus many different fabrication methods may be used to fabricate one or more of the devices.

For illustrative purposes, a non-limiting example method of fabrication is now described. The holographic device was formed using the following method. As a first step, a lift off layer (Omnicoat, from Microchem), was spin coated, onto a silicon carrier, at a speed of 1000 rpm for 1 minute. This was followed by 1 minute of baking at 230° C.

A thick polymer layer was then disposed, to be used as the metasurface substrate. Any suitable polymer may be used. In this example, the polymer used was a SU8, a negative-tone, epoxy based resist from Microchem (MS USA). This polymer is available in different formulations. A blend of SU8 2050 and SU8 2000.5, mixed 1:1 and spun at 5000 rpm produced a thickness of 2.6 µm. This thickness was chosen to guarantee both high flexibility, and robustness of the metasurface.

The substrate layer was then exposed to UV light for 5 minutes. A cross-linking process was completed by heating the substrate to 100° C. for 5 minutes. A layer of gold was deposited using electron beam evaporation. The gold layer is 100 nm in thickness. The gold layer has a thickness that is enough to enable efficient reflection of light. Next we used SU8 to realize a spacing layer, by blending SU8 2000.5 and Cyclopentanone in a 1:3 ratio, and spinning this mixture at 6000 rpm to a thickness of 90 nm. The spacing layer was then exposed to UV light before curing for 2 minutes at 100° C. to cross-link the polymer.

The optical dispersion properties of the film was characterized using a standard retrieval method, which gave a refractive index of 1.67 at $\lambda=600$ nm. The variation in refractive index was less than 1.5% in the wavelength range 570-850 nm. The top layer of gold for the meta-atoms is 40 nm thick.

The meta-atoms are written using a Raith eLINE Plus electron beam device at 30 kV, with a dose of 5 µC/cm2, on a photoresist made of a 1:2 blend of SU8 2000.5 and Cyclopentanone, spun at 5000 rpm and baked for 5 minutes at 90° C.

Ethyl lactate is used to develop the SU8 resist after a post-exposure baking step of 2 minutes at 100° C. An Ar based reactive Ion back-etch was then used to etch the gold, leaving nanorods with the dimensions 75×200×40 nm³. The parameters of this etch were a DC bias of −325V, pressure of 0.05 mBar. The sample was then hard baked at 150° C. for 5 minutes to slightly increase the rigidity of the supporting membrane, to simplify the release step.

A lift off process is then performed to separate the formed metasurface from the silicon carrier. The lift-off process includes dissolving the Omnicoat layer using Microposit MF319.

A more durable metasurface may be provided by capping the metasurface with a protective layer. Alternatively, the metasurface may be protected by being embedded inside an object.

In some embodiments, the metasurface is made using roll to roll printing either by deep UV lithography or nanoimprint. These techniques may be scalable to large scale production. In other embodiments, laser interferometry is used as is the case in dot matrix holograms.

Figure 8:
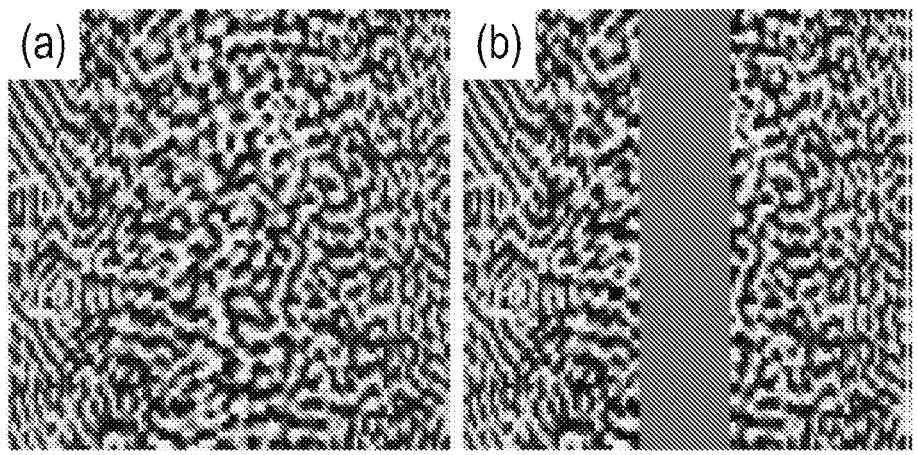
FIG. 8 shows a first and second phase profile.

FIG. 8(a) is an illustration of a first metasurface phase pattern and FIG. 8(b) shows an illustration of a second metasurface pattern. In particular, these images show a phase distribution that is to be encoded on to the metasurface. The second metasurface phase-profile has been retrieved, using a Gerchberg-Saxton algorithm, with a cut-out portion that has no structures present in it. As described below, the second metasurface may provide greater selectivity.

The amount of fall off in the correlation coefficient for a given change in radius of curvature of the surface is referred to as selectivity of the device, such that a higher selectivity means an increased fall off. The device can be designed or tailored to provide an increased, or decreased selectivity depending on the target application as follows.

Selectivity may be improved by increasing the size of the metasurface. For example, on a cylinder, an increase in size increases the maximum angle between the normal to the metasurface and the incident light. When the metasurface is conformed to a surface topology other than the one it was designed for each nanorod continues to de-phase the light. The xyz positions of each nanorod will be different to the ones they were designed for however. This means that the surface is no longer encoding the correct phase information, the effects of which can be seen in FIG. 3. This error occurs for each nanorod the final far field creating many superimposed far field images, the result of which is distorted.

An improvement to selectivity may be achieved by designing a holographic metasurface without a central part of the metasurface phase distribution as shown in FIG. 8(b). A greater selectively is achieved by removing the central part of the metasurface. The central part corresponds to the part of the metasurface which is closest in xyz positions to the designed positions.

Figure 9:
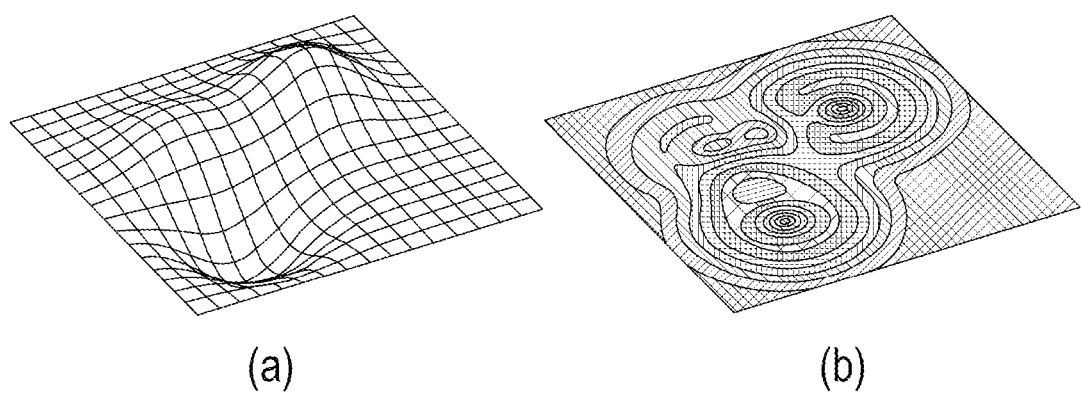
FIG. 9 is representative of a surface topology and information encoded on the surface.

To investigate improving the selectivity, using the Gerchberg-Saxton algorithm, a new hologram phase profile without the central ⅓ was designed, as shown FIG. 8(b). All other simulation parameters are the same. The simulation was focused on a 6 mm convex radius of curvature FIG. 9 illustrates, in further detail, how information can be encoded onto a metasurface. The left hand plot shows a topology of the metasurface. The right hand plot represents a measure of information encoding density. To improve sensitivity, information should be encoded in the lighter areas instead of the darker areas.

Figure 10:
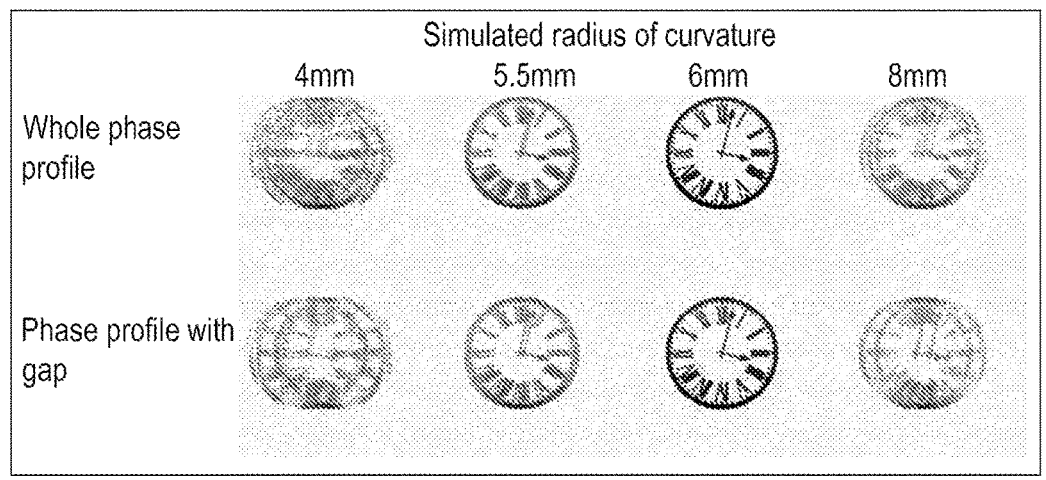
FIG. 10 shows qualitative results obtained using two different metasurfaces.
Figure 11:
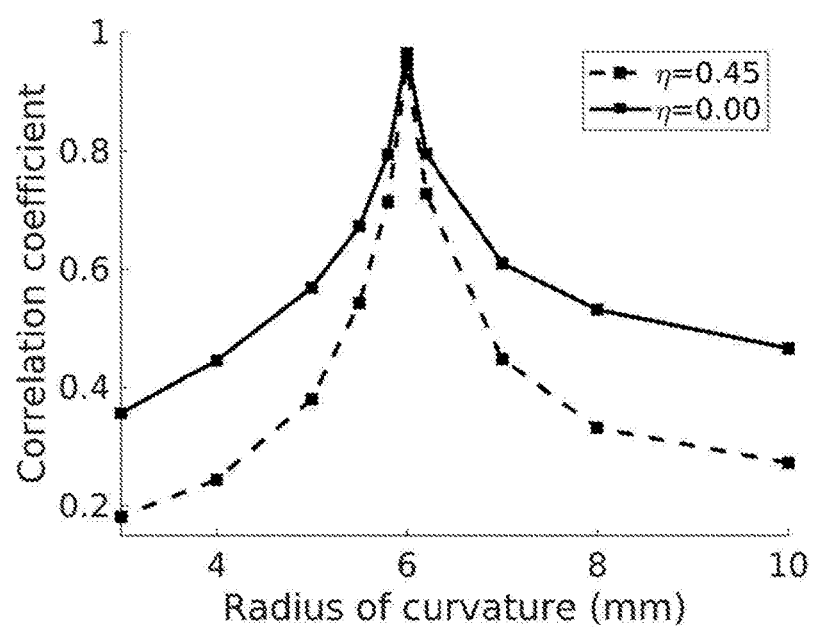
FIG. 11 shows a plot of a correlation coefficient for two different metasurfaces.

FIG. 10 shows a qualitative difference in selectively between the two metasurfaces associated with FIG. 8(a) and FIG. 8(b). FIG. 11 shows a quantitative measure in the difference in selectively between the two metasurfaces associated with FIG. 8(a) and FIG. 8(b).

FIG. 10 shows four different images obtained for each of the two metasurfaces: the first metasurface having a whole phase profile and the second metasurface having a phase-profile with a gap. The metasurface was designed to give a high quality, undistorted image when applied to a cylindrical surface having a 6 mm curvature. This is clearly seen in FIG. 10. The images produced when applied to other radii of curvature are also shown.

The images obtained and shown in FIG. 10 were used to provide a quantitative measure of correlation, as shown in FIG. 11. FIG. 11 is a plot of correlation of images produced by the two metasurfaces against the radii of curvature to which the metasurfaces are applied to. The upper line shows the metasurface associated with FIG. 8(a) and the lower line shows the corresponding result for the metasurface associated with FIG. 8(b). Although the holograms perform similarly when conformed to their designed radius of curvature the second metasurface has a far steeper falloff in correlation coefficient when used on an incorrect radius of curvature.

In further detail, FIG. 11 shows the sensitivity to topology deformations along a cylindrical curvature away from their designed case of 6 mm. The upper plotted line ($\eta$=0.00) corresponds to a case where the full area of the holographic device is used to encode information. The lower plotted line ($\eta$=0.45) corresponds to a case where the holographic information is encoded in the areas with the greatest gradient changes (in this case everywhere but the central 45% of the hologram). As a result of this differences, the lower plot is more sensitive to topology deformations than the upper line.

By providing a metasurface without specific parts or specific structures, the rate of degradation against change from a designed surface topology can be tailored. Conversely, the degradation versus change from designed surface topology could be decreased for applications where a robust far-field image is required.

In further detail, arrangements of the structures can be modified or designed so that, the number of structures per unit area or the amount of information represented by the structures varies in dependence on the shape of the surface to which the device is applied. The dependence may be on the gradient or other characteristic of the shape. For a curved, cylindrical topology, the number of structures per unit area and/or the amount of information represented by the structures for portion of the surface or layer having the desired topology is greater towards the edges of the surface than towards the centre of the surface.

A skilled person will appreciate that variations of the enclosed arrangement are possible without departing from the invention. For example, a device having only one desired shape for the substrate and a corresponding curved configuration for the structures of the device has been described. However, the device may be configured to be conformed to more than one desired shape and therefore for the structures to adopt more than one desired configuration. For example, an anti-counterfeiting feature that depends on satisfaction of more than one condition can be implemented (for example, different images when flexed to different curvatures, or the same image or quality of image at more than one specific configuration). Accordingly, the above description of the specific embodiment is made by way of example only and not for the purposes of limitations. It will be clear to the skilled person that minor modifications may be made without significant changes to the operation described.

Further discussion of metasurfaces is hereby provided. The following provides some non-limiting examples of metasurfaces and other substrate techniques which can be used. Metasurfaces (MS) are planar devices with a sub-wavelength thickness comprised of meta-atoms. The optical response of each meta-atom can be tailored by altering its exact shape, dimensions, and position. In addition because MSs are planar their fabrication is greatly simplified compared to bulk metamaterials. Because these MSs have a sub-wavelength thickness they are able to impose abrupt phase changes on incident light. This is unlike traditional materials such as glass lenses which work by phase accumulation and allows for novel functionality such as the generalization of Snell's law, flat lensing, ultrathin vortex wave plates, non-reciprocal EIT, and time-varying MS and Lorentz non-reciprocity.

The MS platform is ideal for realizing holograms as the sub-wavelength features allow for efficient designs, the encoding of three dimensional information, and polarization multiplexing. These MS holograms have applications in displays, security, and the manipulation and storage of information.

Flexibility plays three key advantages in metasurfaces. Firstly it allows for easier scaling to manufacture than the rigid counterpart via roll-to-roll printing. Secondly flexible MSs can be tuned by bending, or stretching. Thirdly flexible, conformable, MSs enable devices on non-planar surfaces such as those on optical fibers, contact lenses, or other non-flat geometries.

Using a non-flat hologram geometry, helicity independence for the quality of the holographic images is broken. To design surface topology specific holograms we use computer generated holography (CGH), and the Gerchberg-Saxton algorithm to design a phase distribution for a particular surface topology. Traditionally in CGH we use 2D Fourier transforms to propagate light in the Gerchberg-Saxton algorithm. In the case of non-flat holography with a large far field image plane the approximations made to simplify light propagation to a standard 2D Fourier transform are no longer valid however. Because of this, and because FFTs only work for the same size of MS and Far field, we instead use the Rayleigh-Sommerfeld formulation for light propagation, which can be expressed as $$U(x', y', z') = -\int\int U(x, y, z) \frac{2(z'-z)}{|r'-r|} \times \left(ik - \frac{1}{|r'-r|}\right) \frac{\exp(ik|r'-r|)}{4\pi|r'-r|} dxdy$$

where $U(x, y', z)$ and $U(x, y, z)$ are the propagated and non-propagated complex light-fields respectively, $z'$ and $z$ are the z coordinates between the propagated and non-propagated light fields respectively, $r'$ and $r$ are the position vectors in the propagated and non-propagated planes respectively, $i$ is the imaginary unit and $k$ is the wavevector.

Figure 12:
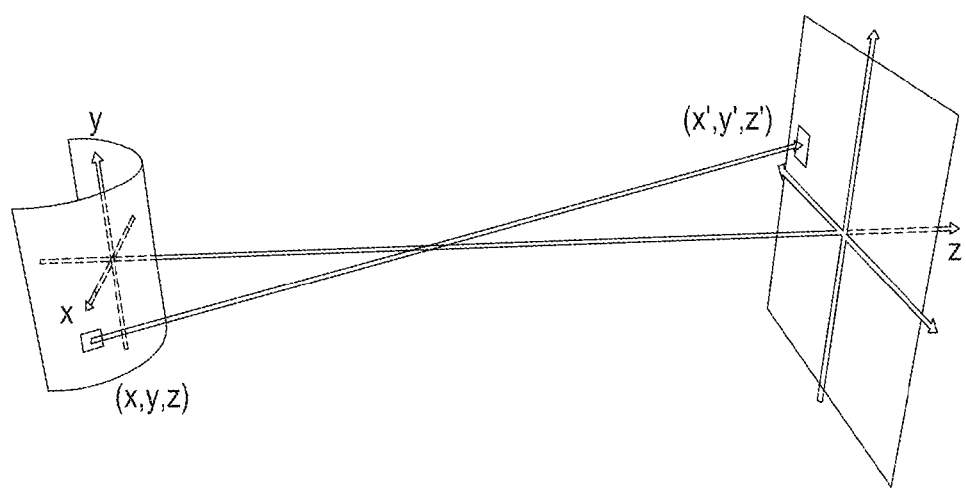
FIG. 12 illustrates light propagating in accordance with the Rayleigh-Sommerfeld method.

An illustration of propagating light with the Rayleigh-Sommerfeld method is shown in FIG. 12. Because we are operating many wavelengths away from the MS the far field term dominates the near field term in the Rayleigh-Sommerfeld propagator. As such we can simplify the above equation to the Kirchoff equation to reduce memory requirements and to speed up the light propagation calculation. The Kirchoff equation assumes an isotropically propagating wave. In the case of nanorods, the wave has a preferred direction. The majority of light is found to be reflected along the trajectory as calculated by Snell's Law. To compensate for this anisotropy we introduce a directivity term which is dependent on the angle between the normal vector to the MS at a given point and a particular point in the far field. This modified Kirchoff equation is then given by:

$$U(x', y', z') = \\ -\int\int U(x, y, z) \frac{2(z'-z)}{|r'-r|} \times ik \times \frac{\exp(ik|r'-r|)}{4\pi|r'-r|} \times D(x', y', z'x, y, z) dxdy$$

where $D(x', y', z', x, y, z)$ is the directivity of the nanorod as calculated by simulation and compensates for the non-isotropic emission from the nanorod antennas. A further correction could be made for exciting the nanorods off-angle but this was deemed un-necessary with the degree of curvature that we were using.

Unlike holograms on flat surfaces, the quality of the holographic image resulting from Berry dephasing on a non-flat surface depends on the helicity of the light. This result can be seen by rewriting the previous equation as:

$$I(x_F, y_F, z_F) = \left|\Gamma(x_F, y_F, z_F)\int\int A_0 \times \exp(i[\phi_0(x_N, y_N, z_N) + \phi_c(x_N, y_N, z_N)]) \times \exp\left(ik\frac{(x_F-x_N)^2 + (y_F-y_N)^2}{2(z_P+z_N)}\right) dx_N dy_N\right|^2$$

$I(x_F, y_F, z_F)$ is intensity of light in the far-field, $\Gamma(x_F, y_F, z_F)$ is a constant that slowly varies over the holographic image place, $A_0$ is the amplitude of the wave propagating from each Huygens source, $\varphi(x_N, y_N, z_N)$ is the holographic phase as found on a flat surface, and $\varphi(x_N, y_N, z_N)$ is an additional phase term to compensate for the non-flat surface topology. $\varphi_c(x_N, y_N, z_N)$ compensates for differences in z across the hologram, as can be seen in FIG. 13.

Figure 13:
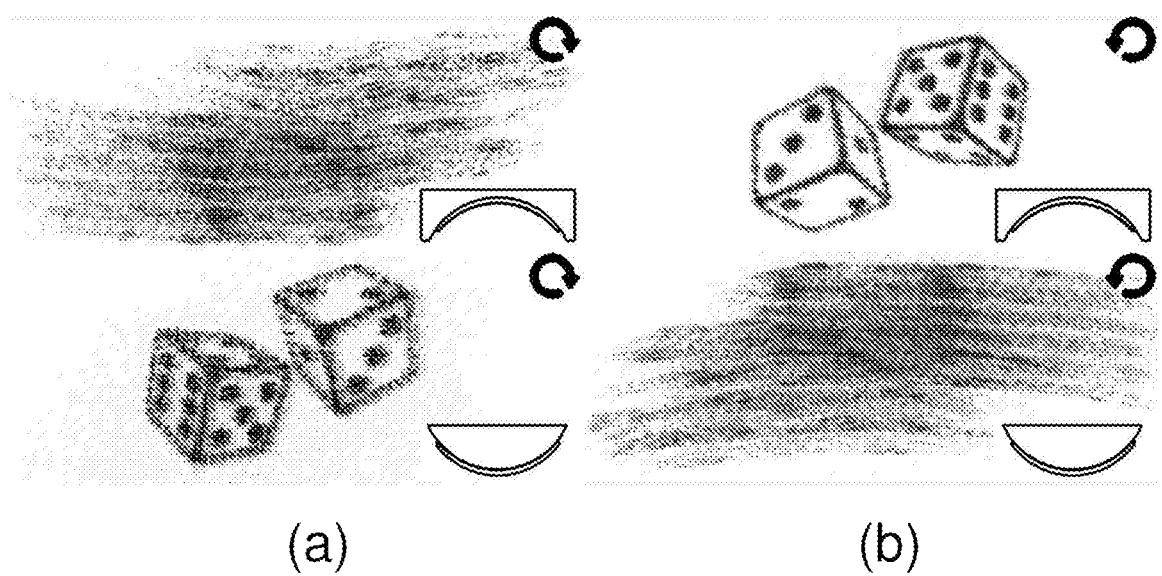
FIG. 13 shows plots and holographic images showing a relationship between helicity of light and surface profile.

FIG. 13 shows real photographic images (inverted for clarity) produced by a holographic device designed for operation with left handed circularly polarized light and to produce a sharp image when applied to a concave curvature. The top right hand image shows a sharp image produced when the device is applied to a concave curvature and using left handed circularly polarized light. The bottom right image shows the distorted image produced when the device is applied to a convex curvature and using left handed circularly polarized light.

The top left image shows a distorted image produced when the device is applied to a concave curvature but using right handed circularly polarized light. The bottom left shown an image produced when the device is applied to a convex curvature using right handed circularly polarized light. The bottom left image is reversed and not a sharp as the top right image. The image is noticeably different in quality to the top right image.

For the case of Berry dephasing, if we then use light with the opposite helicity our holographic phase $\varphi_0(x_N, y_N, z_N)$ changes to $-\varphi_0(x_N, y_N, z_N)$. For a flat surface $\varphi_c(x_N, y_N, z_N)=0$, so if we rotate the helicity of the light we can then derive the following condition $I'(x_F, y_F, z_F)=I(-x_F, -y_F, -z_F)$ from the above equation, where $I'(x_F, y_F, z_F)$ is the intensity of light in the far field for light with the opposite helicity.

When this equation holds true the holographic image is shown rotated $\pi$ radians about the z axis in the x-y plane. This result has been experimentally demonstrated. For a non-flat surface $\varphi_c(x_N, y_N, 0)$ is non-zero.

As such if the helicity of the light is rotated the above condition for I' cannot be derived. Replacing $\varphi_c(x_N, y_N, z_N)$ with $\varphi_c(x_N, y_N, -z_N)=-\varphi_c(x_N, y_N, z_N)$ in the Above Equation Allows derivation of the condition.

The statement $\varphi_c(x_N, y_N, z_N)=-\varphi_c(x_N, y_N, z_N)$ is valid in the case of Pancharatnam-Berry metasurface holograms as can be observed from FIG. 13. FIG. 13 shows the relationship between helicity and surface profile. A clear image is shown for RCP light on a convex cylindrical surface with a radius of curvature of 6 mm. Another clear image that is rotated $\pi$ radians about the z axis in the x-y plane can be seen for LCP light on a concave cylindrical surface with a radius of curvature of 6 mm. In the cases of RCP light on a concave cylindrical surface and LCP light on a convex cylindrical surface, a distorted image is observed.

The invention claimed is:

1. A holographic security or identification device comprising:
   a flexible substrate configured to be conformable to a desired, curved shape characterized by a gradient;

a plurality of structures formed in or associated with the flexible substrate and arranged to adopt a desired curved configuration when the flexible substrate is conformed to a desired curved shape, wherein the plurality of structures are configured to receive light of a selected at least one wavelength or range of wavelengths and to produce, using the received light, a desired holographic image for security or identification purposes when in the desired curved configuration; and wherein the plurality of structures are arranged such that the number of structures per unit area and/or the amount of information represented by the structures varies in dependence on the gradient of the desired, curved shape.

2. A device according to claim 1, wherein the desired holographic image comprises at least one feature that comprises or represents an identifier.

3. A device according to claim 2, wherein the plurality of structures are arranged such that distortion of the flexible substrate away from the desired curved shape causes a degradation of at least one property in the holographic image of said at least one feature that comprises or represents the identifier.

4. A device according to claim 3, wherein the at least one property of the holographic image of said at least one feature comprises at least one of sharpness, noise, distortion, blur, contrast, position, shape, colour.

5. A device according to claim 2, wherein the plurality of structures are such that if they have a configuration other than the desired curved configuration a degradation of at least one property in the holographic image of said at least one feature that comprises or represents the identifier is produced.

6. A device according to claim 5, wherein the configuration being different to the desired curved configuration is due to inaccuracies in formation, or change, in at least one property of the structures, or due a surface texture or topology on which the structures are formed or attached being different to a desired surface texture or topology.

7. A device according to claim 1 wherein the structures are arranged such that the desired holographic image is obtained when the structures provide the desired curved configuration when arranged as or conforming to a layer or surface having a desired topology.

8. A device according to claim 7, wherein at least one of:
the desired topology is characterized by a gradient that varies across the layer or surface; and
the desired topology has at least one local maxima.

9. A device according to claim 7, wherein at least one of:
the structures are arranged such that the number of structures per unit area and/or the amount of information represented by the structures for portion(s) of the surface or layer having the desired topology varies in dependence on at least one other property of the surface or layer having the desired topology; and
the structures are arranged such that the number of structures per unit area and/or the amount of information represented by the structures is greater for portion(s) of the surface or layer that have a higher value of gradient than for portion(s) of the surface or layer that have a lower value of gradient.

10. A device according to claim 1, wherein the flexible substrate forms part of a flexible object and the structures are formed on or in relation to at least part of the object such that the structures form the desired holographic image when said at least part of the flexible object is flexed to have the desired shape.

11. A device according to claim 10, wherein at least one of:
the structures are formed on or in relation to said at least part of the object by attachment or inclusion of the flexible substrate on or in the flexible object, and/or wherein the flexible object comprises the flexible substrate; and
the structures are arranged such that the structures form the desired holographic image when said at least part of the flexible object is flexed to conform to a shape of a selected further object.

12. A device according to claim 1, wherein the structures comprise meta-atoms in 1D, 2D or 3D or the substrate comprises a metasurface or the plurality of structures comprise at least one of: nanorods, high index dielectrics, nanofins, nanogaps, polymers comprising controllable refractive index, nanodisk resonators, split-ring resonators, nano-crosses and dot matrix diffraction gratings.

13. A device according to claim 1, wherein the desired holographic image comprises at least one feature that comprises or represents an identifier and at least one of:
the identifier comprises at least one of letters and/or numbers and/or an image of an object and/or a graphical identifier; and
the identifier is representative of at least one of: the identity of the object or the device, at least one property of the object or the device, the identity or at least one property of an owner, user, manufacturer or retailer of the device or object, or the identity or at least one property of content stored by or contained in the object.

14. A device according to claim 1, wherein the plurality of structures are further arranged to adopt a further desired configuration when the substrate is conformed to a further desired shape, wherein the plurality of structures are further configured to produce, using the received light, a further desired holographic image for security or identification purposes when in the further desired configuration.

15. A method of using a holographic or security device, comprising providing light to a holographic or security device according to claim 1 thereby to produce a holographic image and determining at least one property of the produced holographic image and/or a degradation of at least one property of the produced holographic image.

16. A method according to claim 15, further comprising at least one of:
comparing the produced holographic image to a target image; and
detecting the produced holographic image to produce a detection signal representative of the produced holographic image and processing the detection signal to determine at least one property of the produced holographic image and/or a degradation of at least one property of the produced holographic image; and
detecting the produced holographic image to produce a detection signal representative of the produced holographic image and processing the detection signal to determine at least one property of the produced holographic image and/or a degradation of at least one property of the produced holographic image.

17. A system for security or identification comprising:
a holographic security or identification device according to claim 1;
a light source configured to produce light of a selected at least one wavelength or range of wavelengths.

18. A system according to claim 17, further comprising at least one of:
- a detector for detecting the produced holographic image thereby to produce a detection signal representative of the produced holographic image; and
- a processing resource for processing the detection signal representative of the produced holographic image to determine at least one property of the produced holographic image and/or a degradation of at least one property of the produced holographic image.

19. An apparatus for handling banknote or other document for use with a banknote or other document handling mechanism comprising a holographic security or identification device as claimed in claim 1,
wherein the apparatus comprises:
- one or more light sensors;
- a roller comprising a curved surface corresponding to the desired, curved shape of the device; and
- a laser or other coherent light source configured to produce light and direct the produced light towards the roller, such that, in operation, the banknote or other document produces the desired holographic image using light from the laser and the one or more sensors detect the produced holographic image to authenticate the banknote or other document.

20. A method of producing a holographic or identification device comprising:
- providing a flexible substrate layer configured to be conformed to a desired curved shape characterized by a gradient;
- providing a plurality of structures in or associated with the flexible substrate layer and arranged to adopt a desired curved configuration when the flexible substrate layer is conformed to a desired shape,
wherein the plurality of structures are configured to receive light of a selected at least one wavelength or range of wavelengths and to produce, using the received light, a desired holographic image for security or identification purposes when in the desired curved configuration, wherein the plurality of structures are arranged such that the number of structures per unit area and/or the amount of information represented by the structures varies in dependence on the gradient of the desired, curved shape.

21. A method of retrofitting a banknote handling apparatus for use with a banknote comprising a holographic security or identification device as claimed in claim 20, wherein the banknote handling apparatus comprises a roller comprising a curved surface corresponding to the desired, curved shape of the device, and wherein the retrofitting comprises:
providing or configuring a processing resource to determine at least one property of a produced holographic image and/or a degradation of at least one property of a produced holographic image.

22. A method according to claim 21, wherein retrofitting further comprises at least one of:
providing a laser or other coherent light source configured to produce light and direct the produced light towards the roller, such that, in operation, the banknote produces the desired holographic image using light from the laser; and
providing one or more sensors to detect the produced holographic image to produce a detection signal representative of the holographic image.

* * * * *